(12) United States Patent
Bergqvist et al.

(10) Patent No.: US 11,242,449 B2
(45) Date of Patent: Feb. 8, 2022

(54) FOAMABLE ETHYLENE POLYMER

(71) Applicant: Borealis AG, Vienna (AT)

(72) Inventors: Mattias Bergqvist, Gothenburg (SE);
Thomas Hjertberg, Kungshamn (SE);
Per-Ola Hagstrand, Stenungsund (SE);
Åsa Hermansson, Gothenburg (SE)

(73) Assignee: BOREALIS AG, Vienna (AT)

( * ) Notice: Subject to any disclaimer, the term of this patent is extended or adjusted under 35 U.S.C. 154(b) by 179 days.

(21) Appl. No.: 16/305,656

(22) PCT Filed: May 31, 2017

(86) PCT No.: PCT/EP2017/063111
§ 371 (c)(1),
(2) Date: Nov. 29, 2018

(87) PCT Pub. No.: WO2017/207605
PCT Pub. Date: Dec. 7, 2017

(65) Prior Publication Data
US 2020/0325314 A1 Oct. 15, 2020

(30) Foreign Application Priority Data
May 31, 2016 (EP) .................................... 16172204

(51) Int. Cl.
*C08L 23/06* (2006.01)
*C08J 9/35* (2006.01)
*C08K 5/14* (2006.01)
*C08J 9/00* (2006.01)
*C08K 5/00* (2006.01)
*C08K 5/098* (2006.01)

(52) U.S. Cl.
CPC .............. *C08L 23/06* (2013.01); *C08J 9/0023* (2013.01); *C08J 9/35* (2013.01); *C08K 5/005* (2013.01); *C08K 5/098* (2013.01); *C08K 5/14* (2013.01); *C08J 2201/03* (2013.01); *C08J 2207/06* (2013.01); *C08J 2323/06* (2013.01); *C08L 2203/202* (2013.01); *C08L 2207/062* (2013.01); *C08L 2314/02* (2013.01)

(58) Field of Classification Search
CPC ........ C08J 9/0023; C08J 9/35; C08J 2201/03; C08J 2207/06; C08J 2323/06; C08J 2201/026; C08J 9/004; C08J 9/0014; C08J 9/0038; C08J 9/0052; C08J 9/04; C08L 23/06; C08L 2314/02; C08L 2203/202; C08L 2207/062
See application file for complete search history.

(56) References Cited

U.S. PATENT DOCUMENTS

| 5,911,940 A * | 6/1999 | Walton ..................... C08J 3/244 |
| | | 264/415 |
| 2006/0189759 A1* | 8/2006 | Walther .............. C08L 23/0815 |
| | | 525/192 |
| 2008/0226858 A1* | 9/2008 | Walter ...................... F16L 9/12 |
| | | 428/36.9 |

FOREIGN PATENT DOCUMENTS

WO    WO 1998/024836 A1    6/1998

OTHER PUBLICATIONS

International Search Report dated Jul. 3, 2017 from PCT/EP2017/063111.

* cited by examiner

*Primary Examiner* — Kara B Boyle
(74) *Attorney, Agent, or Firm* — Fay Sharpe LLP

(57) ABSTRACT

The invention relates to a foamable ethylene polymer composition comprising at least one antioxidant, at least one process aid and at least 80 wt % of a peroxide-treated ethylene polymer composition. The foamable ethylene polymer composition has melt strength of at least 2 cN, a density of 940 to 970 kg/m3, and dissipation factor measured at 1.9 GHz of $50\text{-}80\text{-}10^{-6}$. The invention further relates to a process for making such a foamable ethylene polymer composition, and use of the foamable ethylene polymer composition in a foamed cable insulation.

14 Claims, 1 Drawing Sheet

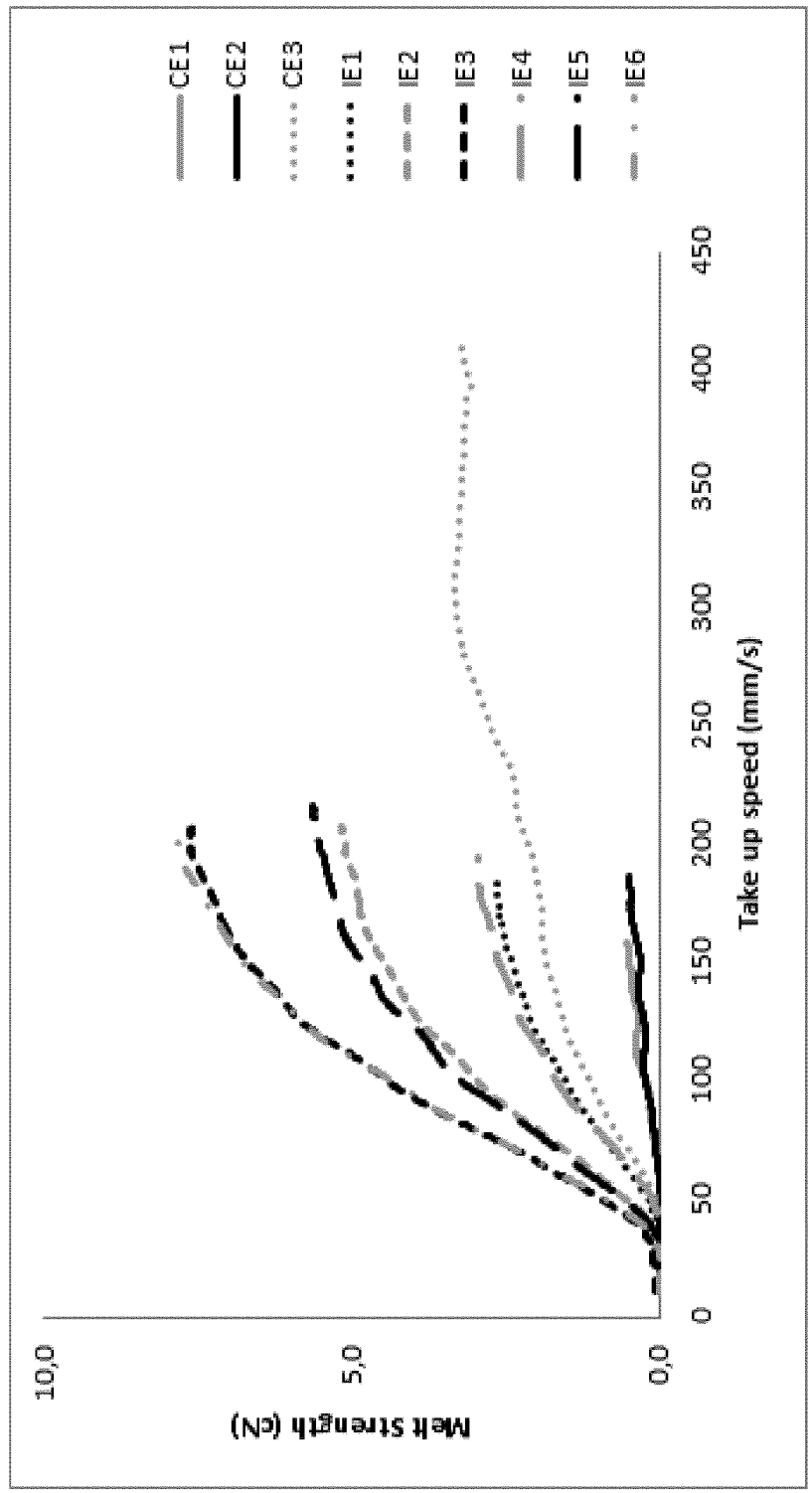

FOAMABLE ETHYLENE POLYMER

CROSS-REFERENCE TO RELATED APPLICATIONS

This application is a 371 of PCT Patent Application Serial No. PCT/EP2017/063111 filed May 31, 2017, which claims priority to European Patent Application Serial No. 16172204.6 filed May 31, 2016, the contents of which are incorporated in their entirety herein.

FIELD OF THE INVENTION

The invention relates to a foamable ethylene polymer composition comprising at least one antioxidant, at least one process aid and at least 80 wt % of a peroxide-treated ethylene polymer composition. It further relates to a process for compounding such a foamable ethylene polymer composition.

BACKGROUND OF THE INVENTION

Communication cables, such as data cables, have an insulation layer that conventionally is made of highly foamed polyethylene. The insulation is foamed to a high degree in order to minimize the dielectric constant of the insulation. It is important that the cell structure in the foamed insulation is homogeneous and that the bubble size is small such that variations in transmission are avoided. One of the factors affecting the cell structure is high melt strength, i.e. high resistance of a polymer melt towards elongation. When bubbles are formed and grow in the melt, the polymers surrounding the bubbles are stretched out. If melt strength is too low, the bubble walls break from the forces of bubble expanding, resulting in a collapsed cell structure. Low density polyethylene (LDPE) shows a behaviour in which the force required for extending the melt one length unit increases after a certain degree of extension. In other words, LDPE has high melt strength.

Inherent dissipation factor of a dielectric material causes undesired attenuation of electrical signal at high frequencies. Insulation material having low dissipation factor is crucial in applications within high frequency signal transmission in order to reduce signal losses. Such materials are conventionally obtained by having highly pure components with low polarity. Unfortunately, LDPE has demonstrated high dissipation factor at high frequencies such as 1.9 GHz. On the other hand, high density polyethylene (HDPE) has low dissipation factor, and would thus be a suitable material for insulation of cables subjected to high frequency transmissions. However, HDPE has low melt strength resulting in poor cell structure.

Foamable polyethylene insulation materials for data cables normally consist of a mixture of HDPE and LDPE in order to combine low dissipation factor with high melt strength. The LDPE content is normally between 15-30% depending on construction. As mentioned above, LDPE has a significantly higher dissipation factor compared to HDPE, meaning that the content of LDPE should be minimized without jeopardizing cell structure quality.

US20100319957 discloses a resin composition and high-frequency co-axial cable using same composition made from mixture of crosslinked polyethylene and non-crosslinked polyethylene. A cheap, flexible process for making a foamable high density ethylene polymer is offered.

U.S. Pat. No. 4,614,764 discloses a linear low density ethylene polymers blended with modified linear low density ethylene polymers. LLDPE is treated with peroxide and used as a masterbatch for improving bubble stability of blown film.

There is still need for providing a foamable ethylene polymer composition with high melt strength and low dissipation factor in the form of pellets that can be supplied directly to cable manufacturers, and that is ready to be used in foamable insulation layers.

SUMMARY OF THE INVENTION

The present invention relates to a foamable ethylene polymer composition, wherein the foamable ethylene polymer composition comprises at least one antioxidant, at least one process aid, at least 80 wt % of a peroxide-treated ethylene polymer composition, and wherein the foamable ethylene polymer composition has a melt strength of at least 2 cN, a density of 940 to 970 kg/m$^3$, and dissipation factor measured at 1.9 GHz of 50-80·10$^{-6}$.

It is an essential part of the invention that the ethylene polymer composition is foamable. It means that the ethylene polymer composition can be made into a foam, defined by having a cellular structure created by chemical blowing agents or physical blowing by a gas during extrusion. In order to enable foaming, high melt strength of the ethylene polymer composition is required, i.e. a melt strength of at least 2 cN.

The foamable ethylene polymer composition preferably has melt strength of 2 to 15 cN, more preferably 3 to 15 cN and most preferably 4 to 15 cN. The foamable ethylene polymer composition has a density of 940 to 970 kg/m$^3$, preferably 950 to 970 kg/m$^3$, and most preferably 960 to 970 kg/m$^3$.

The antioxidant is preferably a phenolic antioxidant. It has been found that phenolic antioxidants are suitable for foamable ethylene polymer composition of the present invention due to little or no impact on the dissipation factor. Sterically hindered phenolic antioxidants, such as pentaerythritol tetrakis(3-(3,5-di-tert-butyl-4-hydroxyphenyl)propionate), are particularly preferred.

As mentioned above, the foamable ethylene polymer composition comprises a process aid. The process aid may be a stearate, preferably zinc stearate. The process aid prevents corrosion of the extruder, and improves processability of the composition. It has been found that stearates are suitable process aids for foamable ethylene polymer composition according to the present invention, due to little or no impact on the dissipation factor.

According to the present invention, the foamable ethylene polymer composition comprises at least 80 wt % of a peroxide-treated ethylene polymer composition. Only one fraction of a peroxide-treated ethylene polymer composition is used, thus avoiding addition of an LDPE fraction and reducing the risk of inhomogeneity which may occur in e.g. blends comprising HDPE/LDPE. Poor blending of fractions will increase dissipation factor. According to the present invention, a homogenous foamable ethylene polymer composition is obtained, which improves the properties of the composition, particularly the dissipation factor, and simplifies the manufacturing process by avoiding mixing step.

The foamable ethylene polymer composition may comprise at least 85 wt %, preferably at least 90 wt % of a peroxide-treated ethylene polymer composition.

The foamable ethylene polymer composition may have dissipation factor measured at 1.9 GHz of 50-75·10$^{-6}$. The foamable ethylene polymer composition thus combines low dissipation factor and good foamability due to high melt strength.

As mentioned above, LDPE has high melt strength well suited for foaming, but at the same time high dissipation factor, unsuitable in high frequency applications. On the other hand, HDPE has low dissipation factor but more or less no melt strength, thus ruling out its use in foamed applications.

It has been found that by adding small amount of peroxide in reactive compounding of HDPE, high melt strength can be achieved in combination with a surprisingly low dissipation factor, despite the presence of polar decomposition products from the peroxides.

The foamable ethylene polymer composition according to present invention has high melt strength and good processability, allowing high speed extrusion of e.g. insulation layer in cables, especially thin insulation layer in cables, such as data cables.

The foamable ethylene polymer composition according to the present invention comprises all necessary components for make a foamed cable insulation and can thus be used directly by a cable manufacturer.

The foamable ethylene polymer composition may further comprise a masterbatch part. A masterbatch is defined by having a high content of non-polymeric additives of at least 30 wt %, preferably at least 50 wt %. Masterbatches can either be added directly into the foamable ethylene polymer composition when the foamable ethylene polymer composition is prepared, or at later stages, typically during extrusion of the cable insulation layers comprising the foamable ethylene polymer composition. Typical masterbatches are colour masterbatches and foaming masterbatches such as blowing agent masterbatches. A typical amount of masterbatch in the foamable ethylene polymer composition is 0.1 to 10 wt %, preferably 0.3 wt % to 7 wt %.

The total amount of additives in the foamable ethylene polymer composition is typically from 0.1 wt % to 10 wt %, preferably 0.5 wt % to 5 wt %.

The foamable ethylene polymer composition can have an $MFR_2$ (2.16 kg, measured at 190° C.) of 0.1 to 50 g/10 min, preferably 0.1 to 10 g/10 min, more preferably 0.5 to 10 g/10 min.

When the foamable ethylene polymer composition comprises a blowing masterbatch with a blowing agent that reacts at low temperature, i.e. below 180° C., the MFR can be assessed as $MFR_5$ measured at 140° C., such that the blowing agent remains inactive. The foamable ethylene polymer composition preferably has $MFR_5$ measured at 140° C. of 0.5 to 50 g/10 min, preferably 0.5 to 20 g/10 min, more preferably 1 to 10 g/10 min and most preferably 1 to 5 g/10 min. The $MFR_5$ measured at 140° C. of the final foamable ethylene polymer masterbatch is typically 0.5 to 20 g/10 min, preferably 0.5 to 5 g/10 min. In order to calculate the $MFR_5$ measured at 140° C. from the $MFR_2$ measured at 140° C. a factor in the range of 0.2 to 0.33 can be used to give a good indication.

The peroxide-treated ethylene polymer composition may comprise an ethylene polymer with a density of 940 to 970 kg/m³ and an $MFR_2$ of 3 to 50 g/10 min prior to peroxide treatment. The ethylene polymer may have a density of 950 to 970 kg/m³ and a $MFR_2$ of 5 to 20 g/10 min. The ethylene polymer is preferably a Ziegler-Natta catalysed ethylene polymer.

$MFR_2$ of a polymer can be varied by adding predefined amounts of peroxide to achieve the desired $MFR_2$. Peroxide treatment is reliable and stable method for adjusting $MFR_2$- values according to the requirements of a particular application. The present invention provides a method that is applicable to different starting MFR, thus a flexible and stable process. This provides a freedom in by optimising the system via the starting MFR and peroxide content.

The foamable ethylene polymer composition according to the present invention is obtained starting form unreacted ethylene polymer composition, as will be discussed in greater detail below. The unreacted ethylene polymer composition may have a crystallinity of 70 to 90%, preferably 75 to 90%. It has been found that high crystallinity decreases the dissipation factor. The crystallinity of the foamable ethylene polymer composition should preferably not be decreased by more than 5% compared to the unreacted ethylene polymer composition, preferably less than 3%. The unreacted ethylene polymer composition should preferably have a crystallisation temperature of 110 to 130° C. The difference in crystallisation temperature of the foamable ethylene polymer composition and the unreacted ethylene polymer composition should be less than 5° C., preferably less than 3° C.

The unreacted ethylene polymer composition may have a density of 940 to 970 kg/m³, preferably 950 to 970 kg/m³, and more preferably 960 to 970 kg/m³. The $MFR_2$ of the unreacted ethylene polymer composition is preferably 3 to 50 g/10 min, more preferably 5 to 50 g/10 min, and most preferably 5 to 15 g/10 min.

The peroxide with which the peroxide-treated ethylene polymer composition is treated may have a half-life temperature T½ at 0.1 h above 133° C. Such peroxides have been found to provide homogenous foamable ethylene compositions. The peroxide may be 2,5-bis(tert-butylperoxy)-2,5-dimethylhexane, CAS 78-63-7.

The foamable ethylene polymer composition may further comprise a processing stabiliser, preferably a phosphite stabiliser, more preferably a hydrolytically stable phosphite processing stabiliser, such as tris(2,4-ditert-butylphenyl) phosphite.

According to the present invention, a foamed cable insulation may be obtained, comprising the foamable ethylene polymer composition as described above. In particular, the foamed cable insulation according to the present invention may be used in data cables. A typical density of the foamed insulation is below 500 kg/m³, preferably below 400 kg/m³. The density should be as low as possible, but conventional low density is above 300 kg/m³.

The invention further relates to a data cable comprising the foamed cable insulation according to the above.

The foamable ethylene polymer composition according to the present invention may be obtained by the process comprising the steps of:
a. providing an unreacted ethylene polymer composition comprising
   i. an ethylene polymer with a density of 940 to 970 kg/m³ and an $MFR_2$ of 3 to 50 g/10 min,
   ii. a peroxide,
   iii. at least one antioxidant, and
   iv. at least one process aid,
b. treating the unreacted ethylene polymer composition with peroxide in a compounding extruder thus providing a foamable ethylene polymer composition, wherein $MFR_2$ of the foamable ethylene polymer composition is decreased with at least 3 g/10 min compared to the $MFR_2$ of the ethylene polymer.
c. pelletizing the foamable ethylene polymer composition, In the foamable ethylene polymer composition according to the present invention, all components are added during step a, prior to peroxide treatment in step b, such that the components maintain their desired properties after peroxide treatment.

According to the process of the present invention, $MFR_2$ of the foamable ethylene polymer composition decreases with at least 3 g/10 min compared with the $MFR_2$ of the unreacted ethylene polymer. Further, $MFR_2$ may decrease with at least 50%. The object of the invention is that the $MFR_2$ of the foamable ethylene polymer composition should be $MFR_2$ of 1 to 50 g/10 min.

The process according to the above is preferably free from any source of irradiation.

The amount of peroxide in step a is 0.05 to 2 wt %, preferably 0.1 to 1 wt %, and more preferably 0.1 to 0.5 wt %.

The process according to the present invention may further comprise a degassing step in order to eliminate peroxide decomposition products. The degassing step may be performed either after step b but before step c, or after step c. Further, the degassing step may be performed after the foamable ethylene polymer composition has been applied to the cable. The degassing step comprises heating the foamable ethylene polymer composition to 50° C. for at least 24 hours, preferably to 60° C. for 24 hours and most preferably to 70° C. for 24 hours.

BRIEF DESCRIPTION OF THE DRAWINGS

The FIGURE is a graph showing melt strength versus take up for the Examples.

DETAILED DESCRIPTION OF THE INVENTION

Test Methods
Melt Flow Rate
$MFR_2$ (190° C.) is measured according to ISO 1133 (190° C., 2.16 kg load).
$MFR_5$ (140° C.) is measured according to ISO 1133 (140° C., 5.0 kg load).
Density
Density is measured according to ISO 1183.
Melting Temperature Tm and Crystallisation Temperature Tc
Melting temperature Tm was measured with a TA Instruments 02000 differential scanning calorimetry device (DSC) according to ISO 11357/3 on 5 to 10 mg samples. Melting temperatures were obtained in a heat/cool/heat cycle with a scan rate of 10° C./min between 30° C. and 180° C. Melting and crystallisation temperatures were taken as the peaks of the endotherms and exotherms in the cooling cycle and the second heating cycle respectively.
Experiments and Results
Sample Preparation
The compositions were compression-moulded at 200° C. in a frame to yield plates of 4 mm thickness, 80 mm width and 80 mm length. The pressure was adjusted to a level providing a smooth surface of the plates. Visual inspection of the plates showed no inclusions such as trapped air or any other visible contamination.
Sample Characterization
Dielectric Constant and Dielectric Loss Tangent
For measurement of dielectric constant and dielectric loss tangent (tan δ) of the materials, a split-post dielectric resonator (SPDR) was used. SPDR was developed by Krupka and his collaborators [see: J Krupka, R G Geyer, J Baker-Jarvis and J Ceremuga, 'Measurements of the complex permittivity of microwave circuit board substrates using a split dielectric resonator and reentrant cavity techniques', Proceedings of the Conference on Dielectric Materials, Measurements and Applications—DMMA '96, Bath, UK, published by the IEE, London, 1996.]. A comprehensive review of the method is found in J Krupka, R N Clarke, O C Rochard and A P Gregory, 'Split-Post Dielectric Resonator technique for precise measurements of laminar dielectric specimens—measurement uncertainties', Proceedings of the XIII Int. Conference MIKON '2000, Wroclaw, Poland, pp 305-308, 2000. The technique measures complex permittivity of dielectric laminar specimen (plates) in the frequency range from 1-10 GHz. The test is conducted at 23° C.

Two identical dielectric resonators were placed coaxially along z-axis such that a small laminar gap is formed between them into which the specimen can be placed. By choosing suitable dielectric materials, the resonant frequency and Q-factor of SPDR can be made to be temperature stable. Once a resonator is fully characterized, only three parameters need to be measured to determine the complex permittivity of the specimen: its thickness, changes in resonant frequency Δf, and changes in Q-factor ΔQ, wherein the changes occur when the specimen is placed in the resonator.

Specimens of 4 mm thickness were prepared by compression-moulding as described above and measured at high frequency of 1.9 GHz.
Attenuation
For pair cables the dependence of attenuation a on dielectric loss factor tan δ is:

$$a = A\left(\frac{1}{d \log\left(\frac{2s}{d}\right)}\right)\sqrt{f}\sqrt{\varepsilon} + Bf \tan\delta\sqrt{\varepsilon}$$

wherein A and B are constants, 2 s is the distance between the wires in a pair, d is conductor diameter, f is frequency, and E is dielectric constant.

A foamed insulation layer generally has a lower dielectric constant compared to a corresponding solid material. Density of a foam is dependent on density of the pure unfoamed starting material and degree of expansion. The dielectric constant $\varepsilon_{Foam}$ can be derived from the density of the foam $\rho_{Foam}$ according to:

$$\varepsilon_{Foam} = a \cdot \rho_{Foam} + b$$

wherein a and b are constants. From the equation follows that the higher degree of expansion, the lower the foam density, thus the lower the dielectric constant. Further information on the concept of attenuation can be found in Standard IEC 61156-7 which specifies a calculation method for the attenuation.
Permittivity
Permittivity is measured by the same method as described for dielectric loss tangent.
Melt Strength
The strain hardening behaviour (melt strength) is determined by the method described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing it down with a defined acceleration. The haul-off force F in dependence of draw-down velocity v is recorded. The test procedure is performed in a standard climate-controlled room with controlled room temperature of 23° C. and 50% RH. The Rheotens apparatus is combined with an extruder/melt pump for continuous feeding of the melt strand. The extrusion temperature is 200° C.; a capillary die with a diameter of 2 mm and a length of 6 mm is used. The strand length between the capillary die and the Rheotens wheels is 80 mm. At the beginning of the experiment, the take-up speed of the Rheotens wheels is adjusted to the velocity of the extruded polymer strand (tensile force zero). The experiment starts by slowly increasing the take-up speed of the Rheotens wheels until the polymer strand breaks. The acceleration of the wheels was small enough so that the tensile force was measured under quasi-steady conditions. The acceleration of the melt strand drawn down is 120 mm/sec$^2$. The Rheotens was operated in combination with the PC program EXTENS, a real-time data-acquisition program, which displays and stores the measured data of tensile force and drawdown speed. The schematic diagram in the FIGURE shows in an exemplary fashion the measured increase in haul-off force F (i.e. "melt strength") versus the increase in draw-down velocity v (i.e. "drawability").

Shear Rheology

Dynamic rheological measurements were carried out with an Anton Paar MCR501 rheometer on compression-moulded samples under nitrogen atmosphere at 230° C. using 25 mm diameter plate and plate geometry. The oscillatory shear experiments were done within the linear viscoelastic range of strain at frequencies from 0.01 to 500 rad/s in line with ISO 6721-1. The values of storage modulus (G'), loss modulus (G"), complex modulus (G*) and complex viscosity ($\eta^*$) were obtained as a function of frequency (w).

Extruder Settings

RPM: 200
Melting temperature: 206° C.
Extruder pressure: 13-21 bar
Productivity: 10 kg/h Materials HE1123 is a unimodal Ziegler-Natta catalysed HDPE with MFR$_2$ of 8 g/10 min and density of 963 kg/m$^3$. It contains one antioxidant, one process stabiliser and one process aid. The grade is commercially available from *Borealis* AG.

HE 3465 is a unimodal Ziegler-Natta catalysed HDPE grades with MFR$_2$ of 12 g/10 min and density of 965 kg/m$^3$. It contains one antioxidant, one process stabiliser and one process aid. The grade is commercially available from *Borealis* AG.

LE1120 is an autoclave LDPE with MFR$_2$ of 4.5 g/10 min and density of 923 kg/m$^3$. The grade is commercially available from *Borealis* AG.

EXAMPLES

Foamable ethylene polymer composition samples with different MFR and high melt strength have been produced on grafting line by adding the peroxide, 2,5-Bis(tert-butylperoxy)-2,5-dimethylhexane, during extrusion.

As mentioned above, MFR$_2$ of a composition may be changed by varying the amount of peroxide added to the composition. Peroxide treatment method is reliable and stable process for changing MFR$_2$. Table 1 disclose how MFR$_2$ can be controlled by adding different amounts of peroxide.

TABLE 1

MFR change after addition of peroxide

| Material | Peroxide addition (wt %) | MFR$_2$ after peroxide addition (g/10 min) |
|---|---|---|
| HE1123 ref | — | — |
| HE1123 | 0.14 | 4.5 |
| HE1123 | 0.40 | 2.09 |
| HE1123 | 0.69 | 1.0 |
| HE3465 ref | — | — |
| HE3465 | 0.32 | 4.6 |
| HE3465 | 0.63 | 2.1 |
| HE3465 | 1.3 | 0.97 |

Differential Scanning Calorimetry

The results from DSC analysis of peroxide materials and reference materials are presented in Table 2. There is only a slight decrease in crystallinity for the peroxide treated materials compared to the reference materials. This is advantageous since a high crystallinity is desired by the invention. The effect on melting and crystallisation temperatures is small meaning that the material is keeping the original properties which is advantageous. A decrease in crystallinity would negatively affect dielectric loss factor and decrease the crystallisation temperature, which in turn would negatively affect the foaming process.

TABLE 2

Melting temperature, crystallisation temperature and crystallinity obtained from DSC analysis

| Material | Melting temperature (° C.) | Crystallisation temp. (° C.) | Crystallinity (%) |
|---|---|---|---|
| CE1 (HE1123 ref) | 132.6 | 120.6 | 78.8 |
| IE1 (HE1123 MFR$_2$ 4.5 g/10 min) | 132.2 | 120.4 | 76.8 |
| IE2 (HE1123 MFR$_2$ 2.1 g/10 min) | 132.4 | 120.9 | 78.3 |
| IE3 (HE1123 MFR$_2$ 1.0 g/10 min) | 132.3 | 121.0 | 76.2 |
| CE2 (HE3465 ref) | 131.7 | 119.9 | 78.4 |
| IE4 (HE3465 MFR$_2$ 4.6 g/10 min) | 131.3 | 120.1 | 75.6 |
| IE5 (HE3465 MFR$_2$ 2.1 g/10 min) | 132.0 | 120.3 | 77.0 |
| IE6 (HE3465 MFR$_2$ 1.0 g/10 min) | 132.1 | 120.7 | 76.2 |

Shear Rheology

For both materials the peroxide treatment has a large impact on the shear complex viscosity $\eta^*$ and it increases dramatically with increased peroxide dosing. The Newtonian plateau where complex viscosity is constant and not affected by increased angular frequencies decreases with peroxide addition, and for the materials treated with peroxide down to an MFR$_2$ of 1 g/10 min the curve gets a LDPE like form with no plateau at all. This means that the materials become very shear thinning, and at high angular frequencies it can be seen that the difference in complex viscosity between reference material and the high melt strength ethylene polymer composition becomes very small. This is positive as it indicates that the peroxide treatment has a low impact on process viscosity, meaning processability is not highly affected. The peroxide treated materials behave more like LDPE when subjected to high angular frequencies, indicating long chain branched structures.

TABLE 3

| Complex viscosity η* (Pa · s) for HE1123 based materials | | | | |
|---|---|---|---|---|
| Angular frequency (rad/s) | CE1 | IE1 | IE2 | IE3 |
| 0.05 | 1215.5 | 3565 | 9001 | 20015 |
| 300 | 356 | 407.4 | 447.8 | 497.9 |

TABLE 4

| Complex viscosity η* (Pa · s) for HE3465 based materials | | | | |
|---|---|---|---|---|
| Angular frequency (rad/s) | CE2 | IE4 | IE5 | IE6 |
| 0.05 | 808.5 | 4378.5 | 10285 | 20375 |
| 300 | 279.5 | 370 | 417 | 466.5 |

Dissipation Factor

Dissipation factor at 1.9 GHz was measured after drying the material for 72 hours at 90° C. HE1106 is a mixture of 70% of the HDPE base resin used in HE1123 and 30% of the LDPE in LE1120. The dissipation factor increases with peroxide addition, but rather slowly. All the HE1123 based materials have lower dissipation factors than HE1106 after drying.

Table 5 contains examples showing that the foamable ethylene polymer composition according to the present invention provides a better balance of high melt strength and low dissipation factor than the two comparative examples.

CE1 is a HDPE material which has a very low dissipation factor, but too low melt strength for foaming. Commercial ref is a commercial product for high frequency communication cables where 70% of HE1123 ref is blended with 30% autoclave LDPE in order to improve melt strength. Commercial ref has high melt strength, but at the same time much higher dissipation factor than for HE1123 ref. As mentioned above, low dissipation factor is extremely important for high frequency communication insulation. IE1 and IE3 are inventive examples of HDPE extruded with peroxide addition in order to yield long chain branched polymer structures. All the inventive examples have higher melt strength than CE1, while dissipation factors of the inventive examples are lower than for CE3. This proves that the invention can provide a foamable ethylene polymer composition having a better balance of high melt strength and low dissipation factor compared to the comparative examples.

TABLE 5

| | Material properties | | | |
|---|---|---|---|---|
| Material | Peroxide addition (ml/kg) | MFR$_2$ (190° C., g/10 min) | Melt strength (cN) | Dissipation factor (·10$^{-6}$) |
| CE1 | — | 8 | 0.6 | 54.3 |
| CE3 (Commercial ref, 70% HE1123 + 30% LE1120) | — | 7.0 | 3.4 | 88.2 |
| IE1 | 0.18 | 4.5 | 2.7 | 65 |
| IE3 | 0.9 | 1 | 7.7 | 76.9 |

Although the present invention has been described with reference to various embodiments, those skilled in the art will recognize that changes may be made without departing from the scope of the invention. It is intended that the detailed description be regarded as illustrative, and that the appended claims including all the equivalents are intended to define the scope of the invention.

The invention claimed is:

1. A foamable ethylene polymer composition, wherein said foamable ethylene polymer composition comprises
   a. at least one antioxidant,
   b. at least one process aid,
   c. at least 80 wt % of a peroxide-treated ethylene polymer composition,
   wherein said foamable ethylene polymer composition has a melt strength of at least 2 cN, a density of 940 to 970 kg/m$^3$, and dissipation factor measured at 1.9 GHz of 50-80·10$^{-6}$, and
   wherein the amount of peroxide with which said peroxide-treated ethylene polymer composition was treated is 0.1 to 2 wt %.

2. The foamable ethylene polymer composition according to claim 1, wherein said foamable ethylene polymer composition has MFR$_2$ (2.16 kg, 190° C.) of 0.1 to 10 g/10 min.

3. The foamable ethylene polymer composition according to claim 1, wherein said foamable ethylene polymer composition has crystallinity of 70 to 90%.

4. The foamable ethylene polymer composition according to claim 1, wherein said foamable ethylene polymer composition has crystallisation temperature of 110 to 130° C.

5. The foamable ethylene polymer composition according to claim 1, wherein the process aid is a stearate.

6. The foamable ethylene polymer composition according to claim 1, wherein said peroxide-treated ethylene polymer composition is derived from an ethylene polymer with a density of 940 to 970 kg/m$^3$ and an MFR$_2$ of 3 to 50 g/10 min prior to peroxide treatment.

7. The foamable ethylene polymer composition according to claim 1, wherein said peroxide-treated ethylene polymer composition is derived from an ethylene polymer with a density of 950 to 970 kg/m$^3$ and an MFR$_2$ of 5 to 20 g/10 min prior to peroxide treatment.

8. The foamable ethylene polymer composition according to claim 1, wherein the peroxide with which said peroxide-treated ethylene polymer composition is treated has a half-life temperature T½ at 0.1 h above 133° C.

9. The foamable ethylene polymer composition of claim 1, wherein the at least one antioxidant comprises a phenolic antioxidant.

10. The foamable ethylene polymer composition of claim 9, wherein the phenolic antioxidant is sterically hindered.

11. The foamable ethylene polymer composition of claim 9, wherein the phenolic antioxidant is pentaerythritol tetrakis(3-(3,5-di-tert-butyl-4-hydroxyphenyl)propionate).

12. The foamable ethylene polymer composition of claim 5, wherein the stearate is zinc stearate.

13. The foamable ethylene polymer composition of claim 1, wherein the melt strength is in the range of 3 cN to 15 cN and the density is in the range of 950 kg/m$^3$ to 970 kg/m$^3$.

14. The foamable ethylene polymer composition of claim 1, wherein the melt strength is in the range of 4 cN to 15 cN and the density is in the range of 960 kg/m$^3$ to 970 kg/m$^3$.

* * * * *